United States Patent Office 2,716,108
Patented Aug. 23, 1955

2,716,108

COPOLYMERS OF ACRYLONITRILE AND α-CHLOROACETAMIDOACRYLIC ACID AND SALTS THEREOF

Harry W. Coover, Jr., Kingsport, Tenn., assignor to Eastman Kodak Company, Rochester, N. Y., a corporation of New Jersey No Drawing. Application November 14, 1952, Serial No. 320,600

12 Claims. (Cl. 260—85.5)

This invention relates to resinous copolymers of acrylonitrile and α-chloroacetamidoacrylic acid and to a process for their preparation.

Unmodified polyacrylonitrile can be spun into yarn of a high tenacity with a softening point above 200° C. These are desirable properties, particularly the high softening point which is lacking in all other known vinyl polymer fibers. Polyacrylonitrile yarns, however, lack other properties which are necessary for general textile applications. These properties in particular are lack of dye affinity and moisture absorption. Accordingly, the usefulness of polyacrylonitrile yarn is limited for many purposes. A known method for improving the dye affinity and moisture absorption of polyacrylonitrile yarns is to copolymerize acrylonitrile with compounds containing hydrophilic groups, for example, with vinyl acetate, acrylamide, acrylic acid, and the like. The improvements in dye affinity and moisture absorption with modifiers of this kind were obtained, however, at the expense of the softening point of the fiber. In general, it was found that when the desired moisture absorption and dye affinity was obtained, the resulting softening point of the composition was too low for the production of a general purpose textile fiber. I have now found that by copolymerizing acrylonitrile with α-chloroacetamidoacrylic acid in certain proportions, fiber-forming copolymers result, which when spun in a known manner by wet or dry spinning processes, give filaments having high tenactiy, excellent dye affinity and moisture absorption, and at the same time retain the very important property of a high softening point. This latter result was not predictable from the known effect of prior art modifying monomers such as those above mentioned.

It is accordingly, an object of the invention to provide certain resinous copolymers of acrylonitrile and α-chloroacetamidoacrylic acid. Another object is to provide fibers of high quality prepared from such copolymers. Another is to provide a process for preparing such copolymers. Other objects will become apparent hereinafter.

In accordance with the invention, I prepare my new resinous copolymers consisting of from 60 to 95 percent by weight of acrylonitrile and from 40 to 5 percent by weight of α-chloroacetamidoacrylic acid by polymerizing a mixture containing as the sole polymerizable components from 60 to 95 parts by weight of acrylonitrile and from 40 to 5 parts by weight of α-chloroacetamidoacrylic acid compound having the general formula.

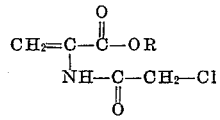

wherein R represents a hydrogen atom, an alkali-metal atom (e. g. sodium, potassium, etc.) or an ammonium group, in the presence of a polymerization catalyst, at a temperature of from about 30° to 100° C. The copolymeric products contain approximately the same proportions of the two polymerizable components as the starting polymerization mixtures, i. e., from 60 to 95 percent by weight of acrylonitrile and from 40 to 5 percent by weight of the α-chloroacetamidoacrylic acid. They are insoluble in water, but soluble in such solvents as dimethylformamide and dimethylacetamide. Some of the copolymers of the invention soften at 250° C. or higher temperatures. However, copolymers having proportions outside the above defined range are not satisfactory fiber-forming materials. For example, copolymers containing less than 5 percent of the α-chloroacetamidoacrylic acid do not give good enough dye affinity, while copolymers containing more than 40 percent of the α-chloroacetamidoacrylic acid show excellent dye affinity but have softening points too low for a general purpose textile fiber.

While the polymerizations can be carried out in mass, it is preferable to conduct the polymerizations in solution or dispersions in an inert liquid which is a nonsolvent for the monomers or the copolymers, water being an especially advantage inert liquid medium. If desired, an emulsifying or dispersing agent can be added to such liquid medium polymerization mixtures in an amount not exceeding about 3 percent, based on the weight of monomers or resulting copolymer. Suitable agents for this purpose include fatty acids (e. g. sodium or potassium stearate, palmitate, etc., ordinary soaps, salts of higher fatty alcohol sulfates (e. g. sodium or potassium cetyl sulfate, sodium or potassium lauryl sulfate, sodium or potassium stearyl sulfate, etc.), salts of aromatic sulfonic acids (e. g. sodium or potassium salts of alkyl-naphthalene sulfonic acids, etc.), or dispersing agents such as starch, methylated starch, finely divided magnesium carbonate, and the like. Mixtures of emulsifying or dispersing agents can be used. Stirring, shaking or tumbling generally give improved product and yields. Normal atmospheric pressures are preferred but the polymerization can also be carried out at reduced pressures or increased pressures under a nitrogen atmosphere.

Suitable polymerization catalysts include peroxides, e. g. benzoyl peroxide, acetyl peroxide, lauroyl peroxide, hydrogen peroxide, etc., persulfates such as ammonium persulfate, sodium persulfate, potassium persulfate, persulfuric acid, etc., perborates such as sodium perborate, ammonium perborate, etc., the water-soluble salts of percarbonic acid, the water-soluble salts of perphosphoric acid, etc. Ammonium persulfate is especially suitable in aqueous polymerizations. Mixtures of catalysts can be used. The amount of catalyst employed can vary from about 0.02 to 3.0 percent, preferably from 0.2 to 2.0 percent, based on the weight of monomers. Advantageously, an activating agent such as alkali metal bisulfites (e. g. potassium or sodium bisulfite, etc.) is used in conjunction with the polymerization catalyst. The polymerizations can also be carried out in the presence of a chain regulator such as hexyl, octyl, lauryl, docecyl, myristyl mercaptans, etc.

The monomeric α-chloroacetamidoacrylic acid of the invention can be prepared, for example, by condensing pyruvic acid with α-chloroacetamide to give the corresponding α,α-diacylamido propionic acid and then treating the latter with glacial acetic acid to split off one of the acylamido groups as shown in the following reaction:

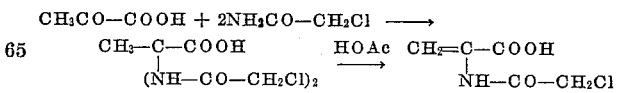

Further details of the above process can be had by reference to the general process described in Coover and Dickey, U. S. application Serial No. 132,214, filed December 9, 1949.

The following examples will serve further to illustrate the resinous copolymers of the invention, and the manner of their preparation.

*Example 1*

2 parts by weight of α-chloroacetamidoacrylic acid and 8 parts by weight of acrylonitrile were added to 100 parts by weight of water to which 0.1 part by weight of ammonium persulfate and 0.2 part by weight of sodium bisulfite were added. The reaction vessel was sealed from the outside air and maintained at 35°–40° C. for 18 hours. A fine, white, insoluble polymer was formed which was filtered off and washed with water and dried. A yield of 9.5 parts by weight of a copolymer was obtained which softened at 250° C. on a Dennis bar. It contained 22 percent by weight of α-chloroacetamidoacrylic acid, the remainder of the polymer being acrylonitrile. The polymer was soluble in such solvents as dimethylformamide and dimethylacetamide. Fibers obtained from this copolymer had a softening above 250° C., a tenacity of 3.5 grams per denier, extensibility of 22 percent and shrunk only 8 percent in boiling water. The fibers exhibited excellent affinity for acetate, direct, vat and wool dyes.

*Example 2*

0.5 gram of α-chloroacetamidoacrylic acid and 9.5 grams of acrylonitrile were added to 100 grams of distilled water, in which 0.1 gram of ammonium persulfate and 0.2 gram of sodium bisulfite were added. Polymerization was completed by heating the mixture at 35° C. for 16 hours. The fine, white, insoluble polymer obtained was filtered out; washed with water and dried. Analysis showed it to contain approximately 5 percent by weight α-chloroacetamidoacrylic acid and the remaining 95 percent of acrylonitrile. The polymer was soluble in such solvents as dimethylformamide and dimethylacetamide. Fibers obtained from this polymer had a tenacity of 4 g./d., extensibility of 19 percent and shrunk 8 percent in boiling water. The fibers had a softening point above 220° C. and showed excellent affinity for acetate, wool and direct dyes.

*Example 3*

4 grams of α-chloroacetamidoacrylic acid and 6 grams of acrylonitrile were added to 100 grams of distilled water to which 0.1 gram of ammonium persulfate and 0.1 gram of sodium bisulfite had been added. Polymerization was completed by heating the mixture at 35° C. for 16 hours. The isolated polymer was insoluble in water, but soluble readily in such solvents as dimethylacetamide. Analysis showed it to consist of a copolymer of approximately 40 percent by weight of α-chloroacetamidoacrylic acid and 60 percent by weight of acrylonitrile. The copolymer had a softening point above 200° C. Fibers obtained from this polymer had a tenacity of 3.5 g./d., extensibility of 25 percent in boiling water. The fibers showed excellent affinity for acetate, wool, direct and vat dyes.

By proceeding as shown in the foregoing examples other copolymers coming within the specified range of 60 to 95 parts by weight of acrylonitrile and 40 to 5 parts by weight of the α-chloroacetamidoacrylic acid can be prepared. For example, satisfactory copolymers and fibers are obtained from monomeric mixtures containing 10%, 15%, 25%, 30% and 35% by weight of the α-chloroacetamidoacrylic and 90%, 85%, 75%, 70% and 65%, respectively, of acrylonitrile.

From their viscous dopes or solutions in solvents such as dimethylformamide, dimethylacetamide, α-butyrolacetone, etc., the copolymers can be extruded, for example, through a spinneret into a cabinet or cell where the solvent is evaporated to give monofilaments which can be spun to yarn. Such viscous dopes can also be coated on a film-forming surface of metal or glass, for example, the solvent evaporated off and the resulting film stripped from the film-forming surface. The copolymers can also be molded with or without plasticizers, fillers, coloring matter, etc. by means of extrusion, injection or compression methods into shaped objects which can be worked into finished form by heat and mechanical means.

In the preceding examples, the products of my invention have been illustrated with the free acid α-chloroacetamidoacrylic acid. However, certain salts such as the alkali metal salts and the ammonium salt of α-chloroacetamidoacrylic acid can advantageously be used in practicing my invention, the sodium, potassium and ammonium α-chloroacetamidoacrylates giving copolymers with acrylonitrile according to the process of Examples 1, 2 and 3, which are also excellent fiber-forming materials. Such salts can be readily prepared by treating the free acid with, for example, the alkali metal hydroxides or ammonium hydroxide before or after copolymerization with the acrylonitrile.

Other solvents which can be used for the preparation of fibers and coating compositions, etc. from the new resinous compositions or polymers of the invention, and mixtures thereof with each other, with polyacrylonitrile or with acrylonitrile polymers containing 85 percent or more of acrylonitrile, include ethylene carbonate, ethylene carbamate, γ-butyrolactone, N-methyl-2-pyrrolidone, N,N-dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethylsulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, I have found that N,N-dimethyl formamide and N,N-dimethyl acetamide are particularly advantageous solvents. The amount of my new resinous copolymers in such solvents can be varied from 10 to 30 percent such solutions or dopes being especially well adapted to practical spinning operations.

What I claim is:

1. A copolymer consisting of from 60 to 95 perecnt by weight of acrylonitrile and from 40 to 5 percent by weight of a compound represented by the following general formula:

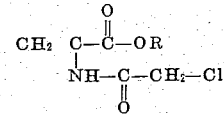

wherein R represents a member selected from the group consisting of a hydrogen atom, an alkali-metal atom and an ammonium group.

2. A copolymer consisting of from 60 to 95 percent by weight of acrylonitrile and from 40 to 5 percent by weight of α-chloroacetamidoacrylic acid.

3. A copolymer consisting of from 60 to 95 percent by weight of acrylonitrile and from 40 to 5 percent by weight of sodium α-chloroacetamidoacrylate.

4. A copolymer consisting of from 60 to 95 percent by weight of acrylonitrile and from 40 to 5 percent by weight of potassium α-chloroacetamidoacrylate.

5. A copolymer consisting of from 60 to 95 percent by weight of acrylonitrile and from 40 to 5 percent by weight of ammonium α-chloroacetamidoacrylate.

6. A copolymer consisting of approximately 78 percent by weight of acrylonitrile and approximately 22 percent by weight of α-chloroacetamidoacrylic acid.

7. A process for preparing a copolymer of acrylonitrile and another monomer selected from those represented by the following general formula:

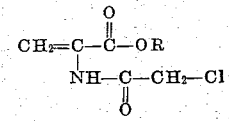

wherein R represents a member selected from the group consisting of a hydrogen atom, an alkali metal atom and an ammonium group, comprising heating a mixture containing as the sole polymerizable components from 60 to 95 parts by weight of acrylonitrile and from 40 to 5 parts by weight of the said monomer, in the presence of a peroxide polymerization catalyst.

8. A process for preparing a copolymer of acrylonitrile and α-chloroacetamidoacrylic acid, comprising heating a mixture containing as the sole polymerizable components from 60 to 95 parts by weight of acrylonitrile and from 40 to 5 parts by weight of α-chloroacetamidoacrylic acid, in the presence of a peroxide polymerization catalyst.

9. A process for preparing a copolymer of acrylonitrile and sodium α-chloroacetamidoacrylate, comprising heating a mixture containing as the sole polymerizable components from 60 to 95 parts by weight of acrylonitrile and from 40 to 5 parts by weight of sodium α-chloroacetamidoacrylate, in the presence of a peroxide polymerization catalyst.

10. A process for preparing a copolymer of acrylonitrile and potassium α-chloroacetamidoacrylate, comprising heating a mixture containing as the sole polymerizable components from 60 to 95 parts by weight of acrylonitrile and from 40 to 5 parts by weight of potassium α-chloroacetamidoacrylate, in the presence of a peroxide polymerization catalyst.

11. A process for preparing a copolymer of acrylonitrile and ammonium α-chloroacetamidoacrylate, comprising heating a mixture containing as the sole polymerizable components from 60 to 95 parts by weight of acrylonitrile and from 40 to 5 parts by weight of ammonium α-chloroacetamidoacrylate, in the presence of a peroxide polymerization catalyst.

12. A process for preparing a copolymer of acrylonitrile and α-chloroacetamidoacrylic acid, comprising heating a mixture containing as the sole polymerizable components approximately 78 parts by weight of acrylonitrile and approximately 22 parts by weight of α-chloroacetamidoacrylic acid, in the presence of a peroxide polymerization catalyst.

References Cited in the file of this patent

UNITED STATES PATENTS

| | | |
|---|---|---|
| 2,461,383 | Isaacs et al. | Feb. 8, 1949 |
| 2,626,944 | Coover et al. | Jan. 27, 1953 |